United States Patent

Harkenrider et al.

[15] 3,700,933
[45] Oct. 24, 1972

[54] CONTROL CIRCUIT
[72] Inventors: Robert J. Harkenrider; John L. Moe, both of Winona, Minn.
[73] Assignee: Waynco, Incorporated, Winona, Minn.
[22] Filed: Sept. 28, 1970
[21] Appl. No.: 76,000

[52] U.S. Cl. .................307/310, 219/499, 219/501, 219/505, 307/247 R, 307/252 B, 307/252 T, 328/73
[51] Int. Cl. ....G05d 23/24, H03k 17/14, H03k 17/66
[58] Field of Search............219/497, 499, 501, 505; 307/252 B, 252 N, 252 T, 252 UA, 247 R, 310, 297, 311; 328/2, 3, 73, 74; 323/24, 40

[56] References Cited

UNITED STATES PATENTS

| 3,553,429 | 1/1971 | Nelson....................219/499 X |
| 3,426,969 | 2/1969 | Anderson, Jr. .........219/501 X |
| 3,328,606 | 6/1967 | Pinckaers...............307/252 T |
| 3,555,302 | 1/1971 | Nuckolls................307/252 T |
| 3,308,362 | 3/1967 | Neumann et al.......307/247 X |
| 3,381,226 | 4/1968 | Jones et al. ....................328/3 |
| 3,453,450 | 7/1969 | Evalds ...........................328/3 |
| 3,474,258 | 10/1969 | Nagy, Jr................219/499 X |
| 3,514,580 | 5/1970 | Brockway..............219/501 X |
| 3,548,156 | 12/1970 | Davey........................219/499 |
| 3,553,430 | 1/1971 | Ting ........................219/501 |

Primary Examiner—Herman Karl Saalbach
Assistant Examiner—L. N. Anagnos
Attorney—Richard J. Renk

[57] ABSTRACT

An electrical circuit is provided wherein pulsed energy samples are applied to a load at spaced intervals and monitored to determine the condition of the load and any changes in pulse energy through the load are compared to a reference and used to initiate control action.

18 Claims, 3 Drawing Figures

INVENTORS
ROBERT J. HARKENRIDER &
JOHN L. MOE
BY
Richard J. Lenk
ATTORNEY

INVENTORS
ROBERT J. HARKENRIDER &
JOHN L. MOE
BY
Richard J. Lenk
ATTORNEY

CONTROL CIRCUIT

BACKGROUND OF INVENTION

In control circuits such as those in temperature, pressure and humidity applications, it has been the practice to utilize a power circuit and a sensor circuit. These controls ordinarily require separate sets of power leads and sensor leads. Because of space and environmental conditions it is sometimes difficult and impractical to run the separate sensor leads to the load area to monitor the load being controlled.

SUMMARY OF INVENTION

The present invention eliminates the necessity of having a separate sensor monitor the load being controlled or the physical variables such as temperature, humidity, pressure, etc. This accomplished by periodically sending a pulse of current through an electrically conductive load and sampling the level of current passing through the load. The voltage generated by the sampling current is then compared to a reference voltage which is correlated to a predetermined control point. The difference between the sampling voltage and the reference voltage is then used to turn on or off a power circuit connected to the load.

Figure 1:
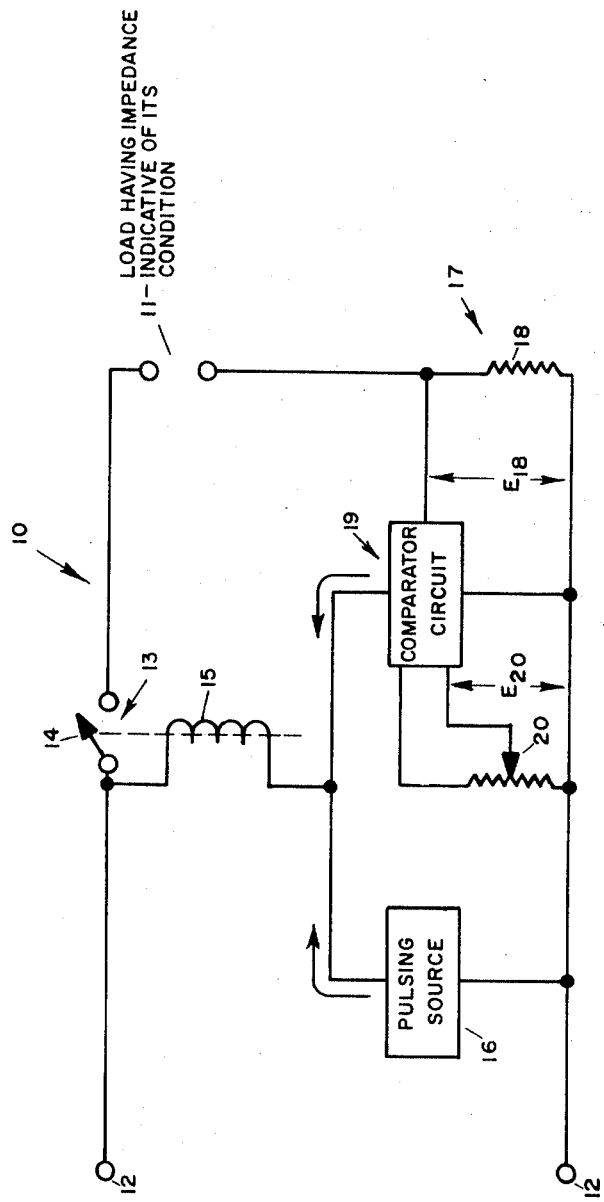
FIG. 1 is a basic schematic circuit illustrating the principles of the invention.

Reference is now made to the FIG. 1 of drawings which broadly illustrates a concept of the circuit of the invention. While not necessarily limited thereto, the circuit is shown generally at 10 and is used to control the temperature of a heater load 11 having a positive temperature coefficient of resistance. In other words, the higher the temperature, the greater the resistance of the load. (The load used may also be one having a negative temperature coefficient of resistance.)

Power is supplied to the circuit through terminals 12; this may be either AC or DC. A switching device 13 such as a relay, SCR, triac or other solid state device is used to switch power to the load 11. In this illustration the switching device is in the form of a relay having a switching contact 14 in its output circuit actuated through a coil 15 in the input circuit thereof.

The switching device is normally open until intermittently closed by a pulsing source 16. Upon closing of switching contact 14, current flows through load 11 and a monitoring circuit 17 including a sampling resistor 18 coupled to the load. Where the load has a positive temperature coefficient of resistance, the hotter the load heating element, the lower the current flow. Likewise, the cooler the element the greater the current flow.

The voltage across the sampling resistor 18 shown by arrow E18 is monitored and coupled to a comparator circuit 19 which includes a reference voltage established for example by a calibrated variable potentiometer 20 or the like. The comparator circuit then translates the difference in voltage between the reference voltage $E_{20}$ and sampling voltage $E_{18}$ into a signal which may be used to actuate the switching device 13.

Specifically, the comparator circuit may be arranged such that when the voltage $E_{18}$ across the sampling resistor 18 exceeds the voltage $E_{20}$ across potentiometer 20 the switching device will be actuated through coil 15. With a positive coefficient of resistance, if the heating element of the load is colder than the desired temperature set by the potentiometer 20, more load current will flow through the heating element because of its lower resistance. An increased current would then flow through sampling resistor 18 and develop a greater voltage-drop across the sampling resistor thereby causing the switching device 13 to actuate and apply power to the load 11.

As its temperature increases the current through load 11 will decrease. The reduced current will gradually reduce the sampling resistor voltage $E_{18}$ and balance the potentiometer voltage $E_{20}$ of the comparator circuit 19 and de-energize switching device 13.

To continually review the temperature of the load 11, the pulser circuit 16 at spaced intervals sends an energy pulse through the input circuit of the normally open switching device 13 to energize it. This causes a short burst of current to flow through the load 11 and sampling resistor 18. If the voltage $E_{18}$ developed across the sampling resistor is less (lower current flow) than the voltage $E_{20}$ across the potentiometer, it indicates that the load is at or above the temperature of the potentiometer setting. Since the voltage $E_{18}$ across the sampling resistor does not exceed the voltage $E_{20}$ across the potentiometer, no signal will be sent by the comparator circuit 19 to the switching device 13 and the latter will immediately de-energize when the pulse from pulsing source 16 ceases.

This pulsing will continue to monitor the load until its temperature drops below the potentiometer set-point. When this happens, because of the voltage differential between the sampling resistor 18 and the potentiometer 20, the comparator circuit 19 will cause the switching device 13 to stay turned on even after the pulsing circuit has ended its cycle. The switching device 13 will then remain energized until the load heat reaches the temperature set-point. When the voltages $E_{18}$ and $E_{20}$ balance, the comparator circuit output will be zero after which the load will be merely pulsed by circuit 16 and the switching device actuated intermittently. As the load cools, continued pulsing thereof will at some point send a pulse through the load 11 and sampling resistor 18 of sufficient magnitude to again cause the switching device to remain on by comparator circuit 19.

Figure 2:
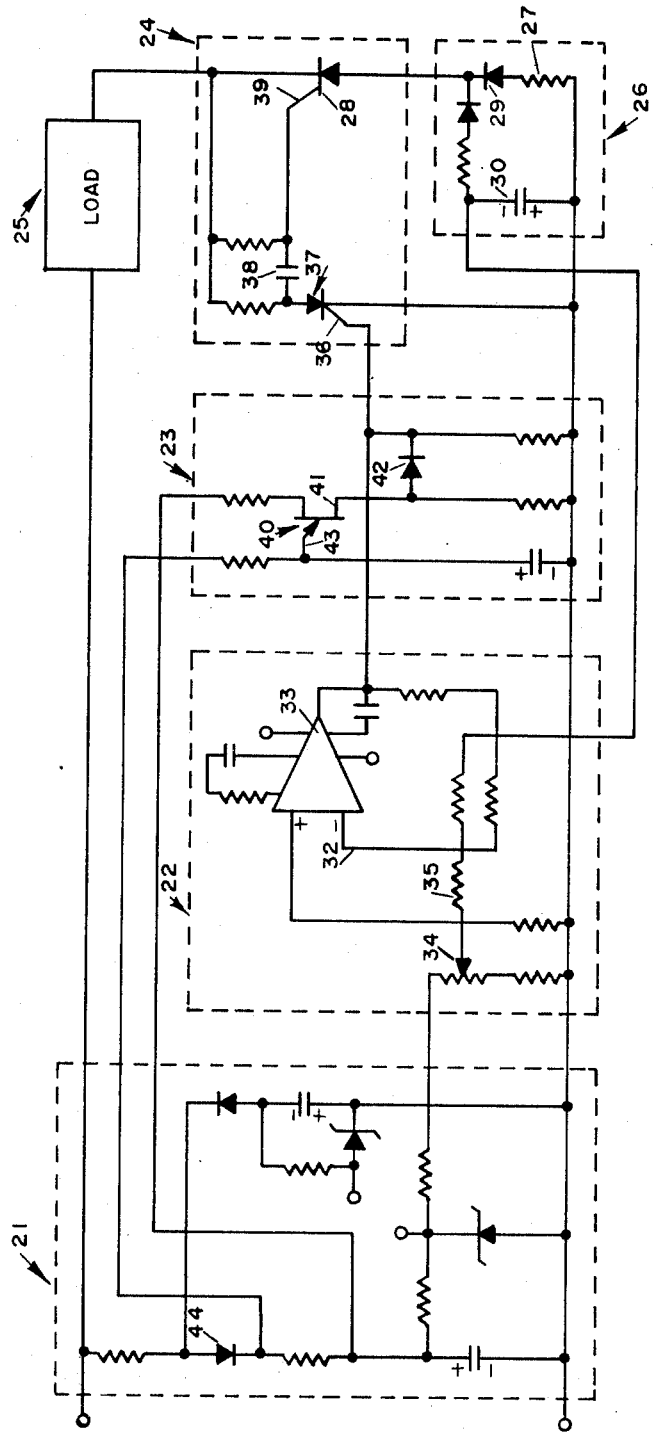
FIG. 2 is a schematic diagram of one embodiment of the invention.

A specific illustration of a circuit providing the concepts of the invention is shown in FIG. 2. As shown in "blocked" areas, this embodiment generally includes a power supply 21, a comparator circuit 22, a pulsing circuit 23, a switching circuit 24, a load 25 and a monitoring circuit 26. Sampling of current through the load 25 and through a sampling resistor 27 is accomplished during the negative half cycle of current flowing through an SCR 28 and a diode 29. (The current through the sampling resistor 27 is then proportional to the current through the load.) Of course, the circuit could be arranged to sample on positive half cycles also.

The voltage developed across the sampling resistor 27 is filtered by a capacitor 30 and applied through a summing resistor 31 to an inverting input 32 of an amplifier 33. A positive reference voltage appearing across a calibrated potentiometer 34 is also applied through its summing resistor 35 to the amplifier input 32.

If the negative voltage developed by current through the sampling resistor 27 is greater than the positive voltage appearing across the potentiometer 34, the net signal input to amplifier 33 will be negative. This will produce a positive DC output from the amplifier.

The amplifier output is then applied to the gate 36 of an SCR 37 connected in back-to-back relationship with SCR 28 in the load power circuit. Firing of SCR 37 causes capacitor 38 to charge. When the AC line voltage reverses, the voltage on capacitor 38 supplies the gate signal for SCR 28 and causes it to turn on. Full wave power is thus applied to the load 25. With power applied to the load, its temperature and resistance will gradually increase and the current will gradually decrease.

As the load current decreases, the negative input voltage developed by sampling resistor 27 gradually decreases until it balances the positive voltage from potentiometer 34. When the voltages balance one another the output from amplifier 33 will be zero thereby removing the gate signal from SCR's 37 and 28 and power through load 25.

The power to the load 25 will stay off until SCR 37 is turned on by an external sampling signal from pulsing circuit 23. This will again gate SCR's 37 and 28 and one full cycle of power will be applied to the load 25. However, sampling resistor 27 will receive power only during the negative half cycle. Because the cycling rate is so short, the sampling pulse power to the load is so minor that no appreciable heat is developed to affect the load condition.

In the present instance the pulsing circuit 23 includes a unijunction transistor 40 whose output pulse from its base 41 is applied through a diode 42 to the gate 36 of SCR 37. The emitter 43 of the unijunction is triggered approximately every second from a half-wave power supply diode 44. The time constant may be varied by changing "RC" valves.

Each time a pulse turns on SCR 37 and thence SCR 28, a comparison is made between the voltages developed across sampling resistor 27 and potentiometer 34; the latter represents the desired temperature setting or condition of load 25. If the load is at the desired set-point temperature or condition, the power is turned off at the end of the pulse signal. If the load temperature or condition is below the set-point, the power will stay on through the output of amplifier 33 long enough to satisfy the unbalance in the net signals applied to the amplifier. In this manner the temperature or other condition being controlled is maintained at the desired set-point.

Figure 3:
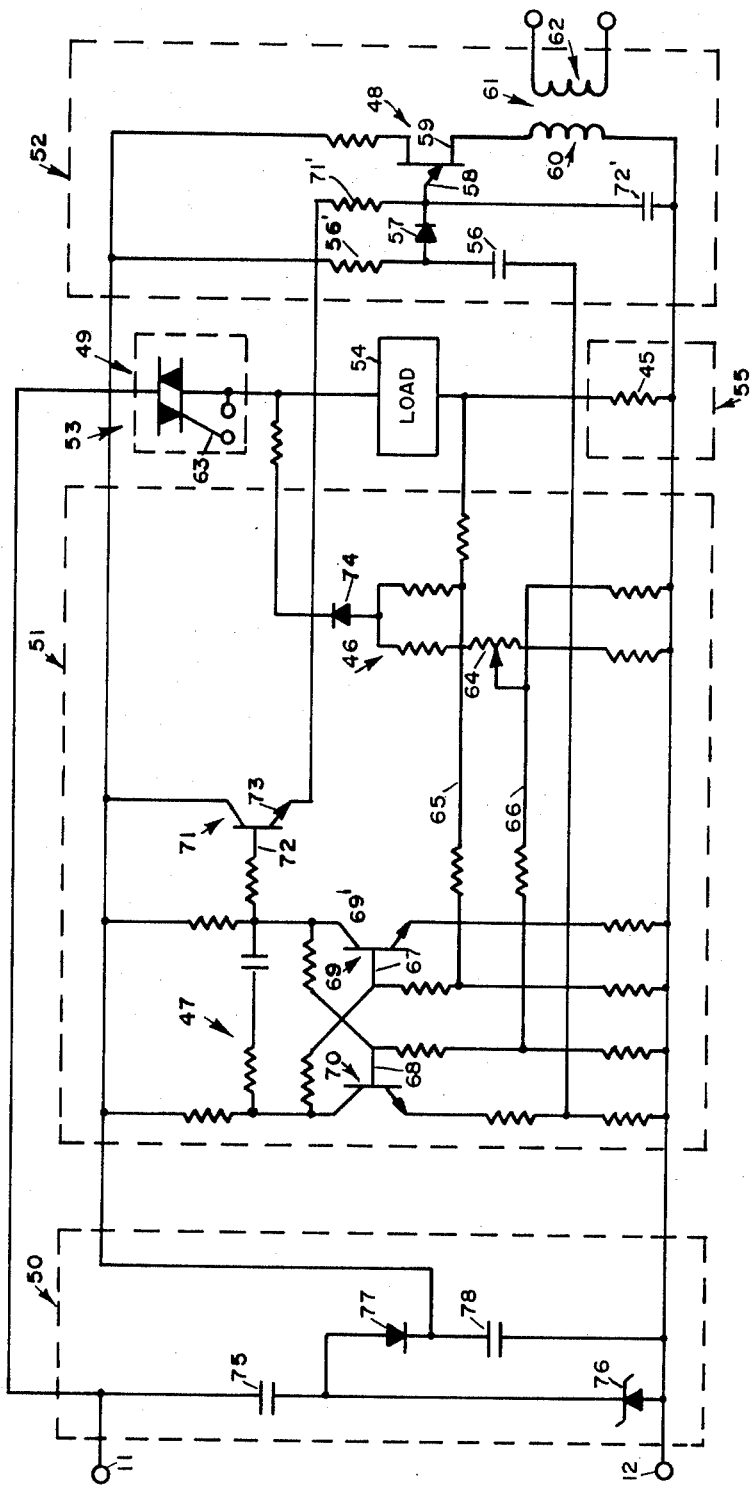
FIG. 3 is a schematic diagram of another embodiment of the invention.

Another embodiment of the invention is shown in FIG. 3, which differs from that shown in FIG. 2 by using a voltage sampling resistor 45 in one leg of a bridge 46. An unbalance in the bridge output is used to trigger a flip flop 47 whose output triggers a unijunction oscillator 48 and thereby switches on triac 49.

In this embodiment, shown by "blocked" areas, there is provided a power supply 50, a comparator circuit 51 including the bridge 46, a pulsing circuit 52 with the unijunction 48, a switching circuit 53 with triac 49, a load 54 and a monitoring circuit 55 with sampling resistor 45. When power is initially applied to terminals 11 and 12, pulsing circuit 52 is activated by charging the capacitor 56 from the power source. The capacitor is coupled via a diode 57 to the emitter 58 of the unijunction 48. Charging of capacitor 56 to a sufficient level causes the unijunction 48 to oscillate and via its base output 59, pulses primary winding 60 of transformer 61. The secondary winding 62 of the pulse transformer is coupled to gate 63 of the triac 49 and the triac 49 will conduct. This will cause a pulse of current to flow through load 54 and sampling resistor 45.

When power is first applied to terminals 11 and 12 capacitor 56 will charge and fire unijunction 48. Because the load is most likely cold, a relatively high current will flow through the sampling resistor 45. This will develop a relatively high unbalanced condition in the bridge 46 wherein a variable potentiometer 64 is used in an opposite arm to set the control-point of the circuit. The bridge output is then coupled via leads 65 and 66 to the flip-flop network 47; specifically the leads 65 and 66 tie to bases 67 and 68 respectively of transistors 69 and 70 of such network.

When the load is below the control set-point, the unbalanced output of bridge 46 makes lead 65 more negative than lead 66. This will turn on flip-flop transistor 70 and turn off the other flip-flop transistor 69. Such action then turns on a transistor 71 having its base 72 coupled to the collector 69' of the flip-flop transistor 69. Conduction of transistor 71 will charge capacitor 72' through the resistor 71'. Unijunction 48 also has its emitter 58 coupled to the capacitor 72' and will be caused to oscillate upon conduction of transistor 71. Transformer 61 will thereby couple the pulse output to triac 49 which will apply power to load 54.

The flip-flop network will stay in the "on" state and power will be applied to the load until the temperature of the load increases reducing current flow through sampling resistor 45 thereby balancing the bridge. When the bridge 46 is balanced, the flip-flop 47 will be turned to its "off" state turning off transistor 71. At this point the pulsing of unijunction 48 from the power supply 50 through an RC network of resistor 56' and capacitor 56 will again take over to supply periodic pulses of energy to the load and sampling resistor 45. These sampling pulses monitor the condition of the load until the bridge is again detected as being unbalanced and the flip-flop again switched. The bridge in this case is supplied half wave power through a diode 74 in its power input.

The bridge concept of this embodiment provides a very unique automatic line-voltage compensation feature. Even if line voltage should drop, the respective legs of the bridge retain their same relative balanced or unbalanced voltage relationship with respect to one another. Very close load control is thus obtained irrespective of line voltage fluctuations.

Another feature of the invention is shown in the embodiment of FIG. 3 wherein very simple and novel concepts are provided in the power supply 50. Because it is vitally necessary to eliminate power dissipation effects, a capacitor 75 acting as a line ballast is in series with a zener diode 76 across the line terminals 11 and 12. This provides a predetermined voltage across the zener. When line 11 is positive with respect to line 12, for example, 15 volts peak will appear across the zener. When line 11 is negative with respect to line 12, there will be the forward diode voltage bias and the DC voltage will drop practically to zero.

The positive voltage across zener 76 is coupled through a paralleling network of a diode 77 and a filter capacitor 78 to provide a smooth regulated DC supply. Not only is excellent regulation and rectification provided with this concept using a minimum number of components, but heat losses are drastically reduced.

While the invention has been described specifically with reference to a resistive type load as may be used with heating elements, it of course is within the scope of the invention that the concepts can be employed to control other loads where a variance in load condition would affect the current flow therethrough i.e., the load would be current sensitive.

We claim:

1. A controller comprising,
   a power source,
   a load having a predetermined coefficient of resistance,
   switching means operably connected between said load and said power source, said switching means having an input and an output,
   means for monitoring the current passing through said load and adapted to develop a sampling voltage,
   a comparator circuit including a reference voltage means,
   the output of said monitoring means being operably coupled to said comparator circuit,
   said comparator circuit having its output coupled to the input of said switching means,
   said comparator circuit operating to energize said switching means to apply power to said load when the voltage of said monitoring means is different than the voltage of said reference voltage means,
   a pulser means also operatively coupled to the input of said switching means and being operable to apply pulses of energy to said switching means at periodic intervals and to periodically energize said switching means to apply power to said load when said switching means is not energized by said comparator circuit.

2. A circuit comprising,
   a power supply,
   a load,
   switching means operably connected between said load and said power source, and adapted to apply full load current to said load when energized, said switching means having an input and an output,
   pulsing means coupled to the input of said switching means to send an energizing pulse to said switching means at spaced intervals and cause said switching means to apply pulses of full load current to said load,
   monitoring means for determining the condition of said load coupled to receive energizing pulses to enable it to generate a signal indicative of the load condition, and
   a comparator circuit coupled to said monitoring means and independently of said pulsing means adapted to initiate the application of full load current to said load when the current through said load reaches a predetermined level as determined by said monitoring means and to cease the application of full load current to the load when said current through said load reaches another predetermined level.

3. A circuit as claimed in claim 2 wherein said monitoring means includes a sampling resistor which provides a signal proportional to the current through the load.

4. A circuit as claimed in claim 3 wherein the sampling resistor provides a voltage signal and said comparator circuit includes a means of generating a reference voltage against which the sampling resistor voltage is compared.

5. A circuit as claimed in claim 4 wherein the voltage difference between said sampling resistor and said reference voltage means is applied to an amplifier, and wherein the amplifier output is coupled to said switching means.

6. A control circuit as claimed in claim 2 wherein said switching means includes a first SCR having its gate coupled to the output of said comparator circuit, and wherein the power circuit of said first SCR is coupled to the gate of a second SCR of reverse polarity, with said SCR's being connected to provide full wave power to said load when said switching means is on.

7. A circuit as claimed in claim 6 wherein said means for sending an energy pulse to said switching means includes a unijunction transistor having its base coupled a source of pulsing signals and its output coupled to the gate of said first SCR.

8. A circuit as claimed in claim 2 wherein said means for sending an energizing sampling pulse to said switching means includes a unijunction transistor.

9. A control circuit as claimed in claim 2 wherein a pair of SCR's are connected back to back with respect to one another with the gate of a first SCR being coupled to the output of said comparator and the output of said first SCR being coupled through a capacitor to the gate of the second of said SCR's, and wherein said monitoring means is coupled to the output of the second of said SCR's.

10. A circuit as claimed in claim 2 wherein said load has a predetermined coefficient of resistance.

11. A circuit as claimed in claim 2 wherein said monitoring means is on one arm of a bridge.

12. A circuit as claimed in claim 11 wherein said comparator circuit includes a reference voltage means in an opposite arm of said bridge.

13. A circuit as claimed in claim 11 wherein the output of said bridge is coupled to a flip-flop circuit and wherein the output of said flip-flop circuit is adapted to energize said switching means.

14. A control circuit as in claim 2 wherein said comparator circuit includes a flip-flop circuit, and wherein the output of said flip-flop is coupled to the control circuit of a unijunction transistor to energize said unijunction transistor in one state of said flip-flop, and wherein separate means are also coupled to the control circuit of said unijunction to pulse and energize said unijunction at spaced intervals.

15. A circuit as in claim 14 wherein the output of said unijunction transistor is coupled to a pulse transformer, and wherein said switching means is a triac and the output of said pulse transformer is coupled to the gate of said triac.

16. A circuit as in claim 2 wherein said monitoring means functions on half-wave intervals of an AC line source.

17. A circuit as claimed in claim 2 wherein said power supply provides an AC supply, and wherein a capacitor is in series with a zener across said supply, and wherein a rectifying element is in series with a second capacitor, the said rectifying element and second capacitor then being paralleled with said zener.

18. A circuit comprising,
 a power source,
 a load having a preselected coefficient of resistance,
 control means operable to apply full load current to said load from said power source,
 means for monitoring the relative resistance of said load and adapted to provide a signal indication thereof,
 comparator means operable to energize said control means so as to apply full load current to said load when the load resistance varies in a predetermined amount as determined by said monitoring means, and
 pulsing means operable to apply substantially full load current pulses to said load to enable said monitoring means to determine the condition of said load when said control means is not energized by said comparator circuit.

* * * * *